(12) United States Patent
Yu et al.

(10) Patent No.: US 10,424,928 B2
(45) Date of Patent: Sep. 24, 2019

(54) REACTIVE POWER PREDICTION CAPABILITY

(71) Applicant: GE Energy Power Conversion Technology Ltd., Warwickshire (GB)

(72) Inventors: Hao Yu, Shanghai (CN); David Smith, Salem, VA (US)

(73) Assignee: GE ENERGY POWER CONVERSION TECHNOLOGY LTD., Warwickshire (GB)

( * ) Notice: Subject to any disclaimer, the term of this patent is extended or adjusted under 35 U.S.C. 154(b) by 118 days.

(21) Appl. No.: 15/314,286

(22) PCT Filed: May 28, 2014

(86) PCT No.: PCT/CN2014/078667
§ 371 (c)(1),
(2) Date: Nov. 28, 2016

(87) PCT Pub. No.: WO2015/180074
PCT Pub. Date: Dec. 3, 2015

(65) Prior Publication Data
US 2017/0250534 A1     Aug. 31, 2017

(51) Int. Cl.
*G05D 17/00* (2006.01)
*H02J 3/18* (2006.01)
(Continued)

(52) U.S. Cl.
CPC .............. *H02J 3/18* (2013.01); *G05B 13/026* (2013.01); *H02J 3/383* (2013.01); *H02J 3/386* (2013.01);
(Continued)

(58) Field of Classification Search
CPC ........ H02J 3/16; H02J 3/36; H02J 3/00; H02J 3/38; H02J 3/18; H02P 6/005;
(Continued)

(56) References Cited

U.S. PATENT DOCUMENTS

| 4,673,823 A | * | 6/1987 | Tanaka | ...................... H02J 3/36 307/11 |
| 5,239,251 A | * | 8/1993 | Lauw | ...................... H02P 6/005 290/31 |

(Continued)

FOREIGN PATENT DOCUMENTS

| CN | 101499664 A | 8/2009 |
| CN | 102255323 A | 11/2011 |

(Continued)

OTHER PUBLICATIONS

PCT Search Report and Written Opinion issued in connection with corresponding PCT Application No. PCT/CN2014/078667 dated Mar. 2, 2015.

(Continued)

*Primary Examiner* — Tuan A Vu
(74) *Attorney, Agent, or Firm* — Wood IP LLC (57) ABSTRACT

A system for regulating energy provided to an electricity grid from an energy source, the system includes a converter configured to receive the energy from the source. The converter is configured to dynamically predict real-time maximum reactive power capability as a function of at least one from the group including (i) a direct current link maximum voltage, (ii) an instantaneous grid network voltage, and (iii) a line current. The predicted maximum reactive power capability is configured for optimizing regulation of the energy.

6 Claims, 10 Drawing Sheets

(51) Int. Cl.
*G05B 13/02* (2006.01)
*H02J 3/38* (2006.01)
*H02P 101/00* (2015.01)
*H02P 27/06* (2006.01)

(52) U.S. Cl.
CPC .......... *H02P 27/06* (2013.01); *H02P 2101/00* (2015.01); *H02P 2207/073* (2013.01); *Y02E 40/30* (2013.01); *Y02P 80/14* (2015.11)

(58) Field of Classification Search
CPC ........... H02P 2101/00; H02P 2207/073; H02P 27/06; G05B 17/02; G06F 17/5009; Y02E 40/30
See application file for complete search history.

(56) References Cited

U.S. PATENT DOCUMENTS

| | | | |
|---|---|---|---|
| 6,492,801 B1 | 12/2002 | Sims et al. | |
| 7,177,728 B2 | 2/2007 | Gardner | |
| 7,818,159 B2 | 10/2010 | Kim et al. | |
| 8,239,070 B1* | 8/2012 | Schlueter | H02J 3/00 700/286 |
| 2008/0077368 A1* | 3/2008 | Nasle | G05B 17/02 703/4 |
| 2008/0215302 A1* | 9/2008 | Nasle | G06F 17/5009 703/13 |
| 2010/0207456 A1* | 8/2010 | Lasseter | H02J 3/38 307/85 |
| 2010/0320762 A1 | 12/2010 | Letas et al. | |
| 2011/0156389 A1 | 6/2011 | Arlaban Gabeiras et al. | |
| 2013/0250635 A1 | 9/2013 | Sivakumar et al. | |
| 2014/0062426 A1* | 3/2014 | Yang | H02J 3/18 323/209 |
| 2015/0042093 A1* | 2/2015 | Gomis Bellmunt | H02J 3/24 290/44 |
| 2015/0054339 A1* | 2/2015 | Zhao | H02J 3/16 307/24 |
| 2015/0357819 A1* | 12/2015 | Pineda Amo | H02J 3/16 290/44 |

FOREIGN PATENT DOCUMENTS

| | | |
|---|---|---|
| CN | 102299527 A | 12/2011 |
| CN | 102354992 A | 2/2012 |
| CN | 102361324 A | 2/2012 |
| EP | 2 164 147 A2 | 3/2010 |
| JP | 2013-074668 A | 4/2013 |
| WO | 2012/152345 A1 | 11/2012 |

OTHER PUBLICATIONS

Extended European Search Report and Opinion issued in connection with corresponding EP Application No. 14893594.3 dated Dec. 13, 2017.

Machine Translation and First Office Action and Search issued in connection with corresponding CN Application No. 201480079383.4 dated Aug. 1, 2018.

* cited by examiner

FIG. 8
(conventional)

REACTIVE POWER PREDICTION CAPABILITY

FIELD OF THE INVENTION

Embodiments of the invention relate generally to the electric grid. More specifically, the present embodiments of the invention relate to converters for regulating electricity supplied to the electric grid from an external energy source.

BACKGROUND OF THE INVENTION

Grid-tied converters, commonly used in association with the electric grid, convert renewable energy into alternating current (AC) format that electric power system can accept. For example, grid-tied converters are used to convert energy from an energy source, such as solar panel, wind turbine, or some other source, into an AC format for feeding energy into the grid, based upon a relevant local grid code.

As understood by those of skill in the art, grid codes are technical specifications defining specific parameters that an external source, or facility, must achieve to connect to the electric grid. The specifications ensure compatibility, safety, and security of the supplied electricity.

By way of background, power flowing into the electric grid includes two types: active power (P) and reactive power (Q). Grid codes differ by countries, but one common request is the grid-tied renewable energy converters are generally required a reactive power compensation ability which must be under the control of grid management system and some grid codes even stress the priority to use the converters' reactive power capability than static VAR compensator when needed.

Conventional grid-tied converters usually include an ability to do the reactive power compensation. Conventional grid-tied converters, however, lack the ability to forecast converters' own reactive power capabilities accurately, to help the grid management system understanding how much the converters can do in reactive power compensation.

Most of these conventional systems perform reactive power capability prediction in a simple way. For example, one common technique estimates the maximum capability of Q as a function of apparent power (S) and active power (P), as $Q=\sqrt{S^2-P^2}$. This approach, however, fails to consider that Q capability is not simply a function of apparent power and active power (P), but is closely related to the external environment of the electric grid. The conventional systems ignore that Q capability is a function of the electric grid's impedance/voltage/frequency and the power converter's internal states (active power/DC bus voltage limit/control techniques). More specifically, these conventional systems lack a capability to accurately predict maximum Q capability.

SUMMARY OF THE EMBODIMENTS

A need exists for methods and systems that accurately predict grid-tied power converter's Q capability in real-time by utilizing power converter internal status information and external connection point feedback information from the electricity grid.

Under certain circumstances, an embodiment of the present invention includes a system for regulating energy provided to an electricity grid from an energy source, the system includes a converter configured to receive the energy from the source. The converter is configured to dynamically predict real-time maximum reactive power capability as a function of at least one from the group including (i) a direct current link maximum voltage, (ii) an instantaneous grid network voltage, and (iii) a line current. The predicted maximum reactive power capability is configured for optimizing regulation of the energy.

The embodiments enable prediction of the power converter's reactive power capability more accurate and comprehensive, which help the grid management system make optimum reactive power compensation strategy.

From a technical perspective, maximum Q capability prediction techniques, constructed in accordance with the embodiments, are substantially independent of the grid impedance, which is usually unknown. These techniques accurately predict maximum Q capability as a function of relevant grid codes, internal converter status information, and external grid connection point feedback information.

In this manner, maximum Q capability prediction can dynamically adapt to different countries' grid code after simple parameter modifications. Methods and systems, constructed in accordance with the embodiments, can be used with numerous renewable and alternative energy supply sources, such as solar and wind, to name a few.

Further features and advantages, as well as the structure and operation of various embodiments, are described in detail below with reference to the accompanying drawings. The invention is not limited to the specific embodiments described herein. The embodiments are presented for illustrative purposes only. Additional embodiments will be apparent to persons skilled in the relevant art(s) based on the teachings contained herein.

BRIEF DESCRIPTION OF THE DRAWINGS

The accompanying drawings, which are incorporated herein and form part of the specification, illustrate the present invention and, together with the description, further serve to explain the principles of the invention and to enable a person skilled in the relevant art(s) to make and use the invention.

DETAILED DESCRIPTION OF THE EMBODIMENTS

While illustrative embodiments are described herein with illustrative embodiments for particular implementations, it should be understood that the invention is not limited thereto. Those skilled in the art with access to the teachings provided herein will recognize additional modifications, applications, and embodiments within the scope thereof, and additional fields in which the lighting systems described herein would be of significant utility.

The following detailed description is merely exemplary in nature and is not intended to limit the applications and uses disclosed herein. Further, there is no intention to be bound by any theory presented in the preceding background or summary or the following detailed description.

Figure 1:
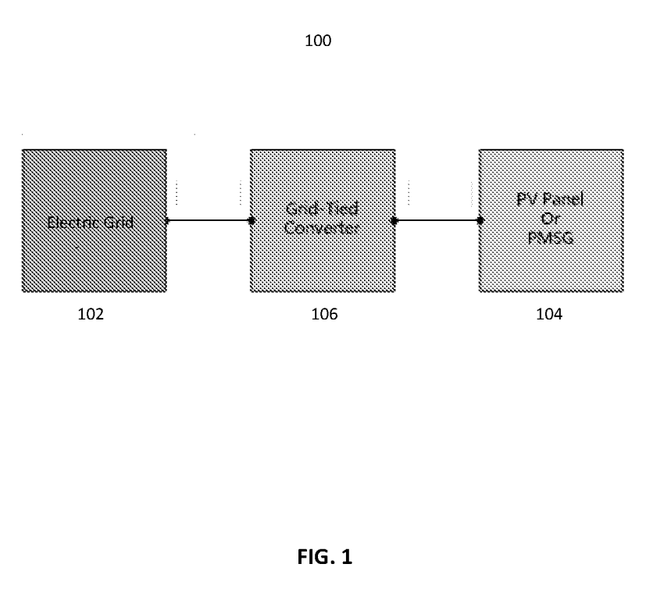
FIG. 1 is a block diagram illustration of an exemplary power management system environment in which embodiments of the present invention may be practiced.

FIG. 1 is a block diagram illustration of an exemplary electricity power management system 100, in which embodiments of the present invention may be practiced. The system 100 includes an electricity grid 102, along with an energy source 104. One such energy source can include a photovoltaic (PV) based solar source providing renewable energy to the electricity grid 102. A grid-tied converter 106 is provided to receive, test, and regulate the energy produced by the energy source 104 to ensure its suitability and compatibility with the electricity grid 102.

In another example, a wind turbine, coupled to a permanent magnet synchronous generator (PMSG), can supply wind generated electricity to the grid-tied converter 106. The converter 106 will analyze the wind generated electricity, regulate it, ensure its suitability and compatibility as a viable energy source for supply to the electricity grid 102.

More specifically, the grid-tied converter 106 regulates the output of energy source 104 to compensate for irregularities, or transient faults, in the electricity output therefrom—irregularities or faults that could ultimately degrade the performance of the electric grid 102.

In the illustrious embodiments of the present invention, and as discussed in greater detail below, the capability to compensate for irregularities, or faults, in the electricity output from external sources is a function of the reactive power capability of the grid-tied converter 106.

By way of background, when power is supplied to the grid 102, the grid presents an inherent capacity, which correspondingly means the grid impedance. Additionally, the external environment can produce malfunctions (e.g., impedance/voltage/frequency) of the grid 102 during operation. These malfunctions, ultimately due to short circuits, lightning damage, or other anomalies, can trigger corresponding failures in equipment used to perform vital functions associated with the grid 102.

Many conventional grid-tied converters include a function to do the reactive power compensation. The challenge, however, is that during operation, converter's reactive power capability is not static, nor is it purely a function of apparent power and active power output. Instead, the reactive power capability is closely related to the grid's operational environment (e.g., impedance/frequency/voltage), in addition to the power converter's own internal states (e.g., active power output/reactive power output/DC bus voltage limit/control algorithm etc.).

Therefore, to optimize regulation of electricity produced by the energy source 104, grid-tied converters should possess a capability to accurately predict reactive power capability—regardless of whether during steady-state or transient conditions occur. In accordance with the embodiments of the present invention, the grid-tied converter 106 possesses the capability to dynamically predict reactive power capability in real-time.

More specifically, the grid-tied converter 106, constructed in accordance with the embodiments, includes a function which can real-time predict the converter's reactive power capability. This prediction capability is based upon status information internal to the grid-tied converter 106 and external connection point feedback information associated with the electric grid 102.

The capability of the grid-tied converter 106 to accurately predict its own reactive compensation volume provides a more effective fault management system. A more accurate assessment of reactive power capability, in turn, enables more effective regulation of electricity (e.g., voltages) associated with the power management system environment 100. Additionally, when regulation fails to prevent malfunctions, and faults occur, the embodiments accelerate recovery and enhance survivability.

Figure 2:
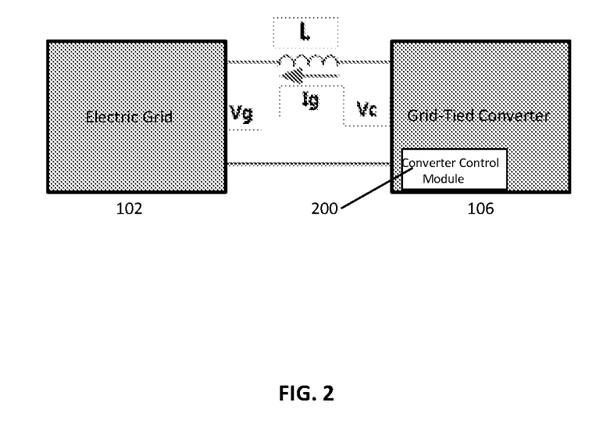
FIG. 2 is a more detailed illustration of the grid-tied converter depicted in FIG. 1, along with relevant electrical connection to the electric grid.

FIG. 2 is a block diagram illustration of a physical model of the grid-tied converter 106 coupled to the electric grid 102, along with various parameters generally indicative of steady-state (i.e., fault-free) grid operation.

The grid-tied converter 106 includes a converter control module 200. Discussed in greater detail below, the converter control module 200 includes additional sub-modules and components for optimizing the accuracy of the reactive power capability prediction of the grid-tied converter 106.

As depicted in FIG. 2, the grid-tied converter 106 produces a power converter instantaneous line voltage Vc. An inductor L represents an inductance of the power converter 106, producing a grid current Ig, as Vc flows therethrough, and an instantaneous grid line voltage Vg. In the embodiments, the interplay between Vc, Vg, Ig, and L is relevant to the Q capability prediction of the grid-tied converter 106.

In the exemplary embodiments, the reactive power compensation is a function of Q, which stabilizes the grid voltage Vg, enhancing the operational efficiency of the electricity power management system 100. As understood by those of skill in the art, Q can be further divided into two types: lead reactive power (lead Var) and lag reactive power (lag Var).

Figure 3:
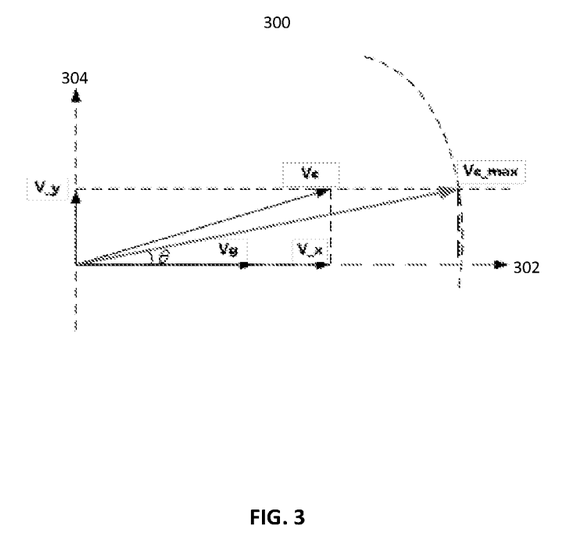
FIG. 3 is a graphical illustration of the maximum line voltage of the grid-tied converter depicted in FIG. 2.

FIG. 3 is a graphical illustration 300 of the influence by DC-link maximum voltage (Vdc_max), which is integral to accurately determining lead Var. The maximum achievable AC line voltage (Vc_max) of the grid-tied converter 106 is a function of, and physically limited by, Vdc_max.

FIG. 3 depicts vector relationships determining the maximum lead Var. The maximum lead Var is also a function of grid frequency (fg). Assuming the instantaneous grid line voltage is Vg and feed power is Pout, grid capacity is sufficiently large such that Vg will not change during Q compensation.

The graph 300 depicts a short vector Vc and a longer vector Vc_max. The vertical vector V_y remains unchanged, resulting in Pout also remaining unchanged. Based upon these equalities, the maximum lead reactive power (Qvar_pos_max_1) can be obtained in the following manner:

```
Z = 2*pi*fg*L*sqrt(3)      // Z: line impedance
I_x = Pout/(sqrt(3)*Vg)    // I_x: line current at X axis 302
V_y (voltage at Y axis 304) = I_x * Z
```

At this instant in time, for Vc_max=Vdc_max*K (K value is based on converter's topology), and Pout remains constant, as noted above. Thus, the maximum lead reactive power capability is:

$$\theta = a\sin(V\_y/Vc\_max)$$

$$Qvar\_pos\_max\_1 = sqrt(3)*Vg*(Vc\_max*\cos(\theta) - Vg)/Z \quad \text{eq}(1)$$

By way of explanation, grid capacity cannot be infinite since it includes some level of impedance. As a result, Q output will incrementally increase Vg. These incremental increases in Vg ultimately reduce the converter's reactive power capability because as Vg increases, Vc max is unchanged. However, this reduction in reactive power capability is accounted for in the exemplary embodiments of the present invention.

Figure 4:
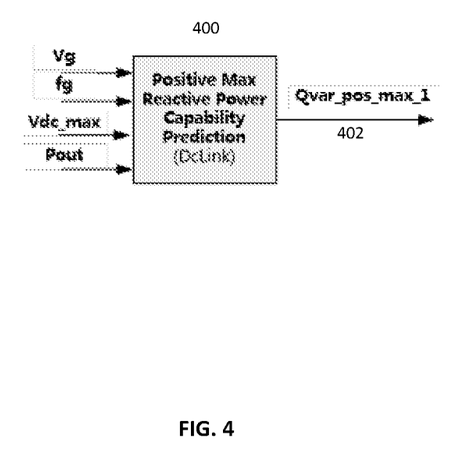
FIG. 4 is a block diagram illustration an exemplary lead maximum reactive power capability prediction module constructed in accordance with the embodiments.

FIG. 4 is a block diagram illustration an exemplary lead reactive power capability prediction module 400 configured for dynamically producing an output (Qvar_pos_max_1) 402 in real-time. The Qvar_pos_max_1 signal 402 is a comprehensive prediction of lead Q capability-produced as a function of internal converter status information, and external grid connection point feedback information. Determined in this manner, the Qvar_pos_max_1 signal 402 prediction value is independent of the impedance of the grid 102.

Figure 5:
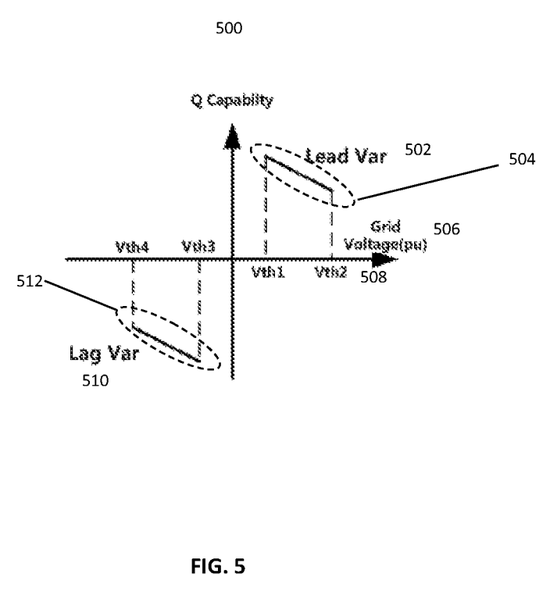
FIG. 5 is a graphical illustration of an exemplary converter error correction technique in accordance with the embodiments.

FIG. 5 is a graphical illustration of an exemplary correction technique 500 in accordance with the embodiments. The graph 500 depicts lead Var 502 (Q>0) associated with a lead voltage threshold 504, having an upper (Vth2) and lower (Vth1) level. The voltage threshold 504 is a function of a field grid code 506, along an X axis 508. Similarly, lag Var 510 (Q<0) is associated with a lag voltage threshold 512 having an upper (Vth3) and lower (Vth4) level.

As noted above, each country has its own grid code, which establishes voltage limitations for its electricity grids. For example, the United States' voltage limit (i.e., grid code) is 0.9 PU-1.1 PU. Thus, voltage levels for the U.S. electricity grids cannot exceed the upper boundary of this range.

During Q compensation, Vg will change accordingly, and its magnitude is a function of the grid impedance (usually unknown). An emergency transient, or some other anomaly, could occur during Q compensation. As a result, Vg could approach a predetermined upper or lower voltage boundary, established by the relevant field grid code.

Accordingly, the converter's Q capability prediction function must be equipped with a correction technique for limiting the Q output and reflecting this dynamic change in Q capability prediction in order to prevent voltage levels from exceeding the upper or lower boundaries of these established grid code voltages. Converters constructed in accordance with the embodiments provide error correction to help mitigate this problem.

Returning to FIG. 5, the lead reactive power capability correction technique can be classified as interpolation plus hysteresis control which is:
In FIG. 5, if $$Vgrid >= Vth2$$

$$Qvar\_pos\_max = Qvar\_out - Constant//(Constant > 0)$$

Else If $$Vth1 =< Vgird <= (Vth2 - hysteresis)$$

$$Qvar\_pos\_max = Qvar\_prediction + (Qvar\_out - Constant\ Qvar\_prediction)*(Vgrid - Vth1)/(Vth2 - Vth1)$$

Else

Qvar_pos_max=Qvar_prediction (Vth1, Vth2 are voltage threshold setting associated with different field grid codes, Qvar_out is the reactive output of converter)

The lag reactive power capability correction technique can be classified as interpolation plus hysteresis control, which is:
Again, in FIG. 5,
If Vgrid<=Vth4

$$Qvar\_neg\_max = Qvar\_out + Constant//(Constant22\ 0)$$

Else If $$Vth3 >= Vgird >= Vth4 - hysteresis$$

$$Qvar\_neg\_max = Qvar\_prediction + (Qvar\_out + Constant - Qvar\_prediction)*(Vgrid - Vth3)/(Vth4 - Vth3)$$

Else

Qvar_neg_max=Qvar_prediction (Vth3, Vth4 are voltage threshold settings associated with different field grid code, Qvar_out is the reactive output of converter)

Figure 6A:
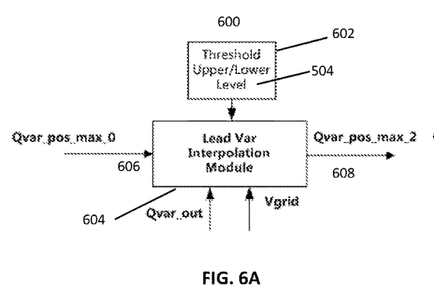
FIG. 6A is a block diagram illustration of a Q positive interpolation module constructed in accordance with the embodiments.

FIG. 6A is a block diagram illustration of a lead Q module 600 constructed in accordance with the embodiments. The lead Q module 600 includes a threshold upper/lower level module 602 and a lead var interpolation module 604. The threshold upper/lower level module 602 processes the upper/lower level voltage threshold 504, discussed in reference to FIG. 5.

The interpolation module 604 is configured to receive a conventionally determined Qvar_pos_max_0prediction signal 606, Qvar_out, and Vgrid values as inputs. These input values are analyzed based upon the upper lower level voltage threshold 504. A Qvar_pos_max_2 signal 608 is produced as an output from the lead var interpolation module 604.

Figure 6B:
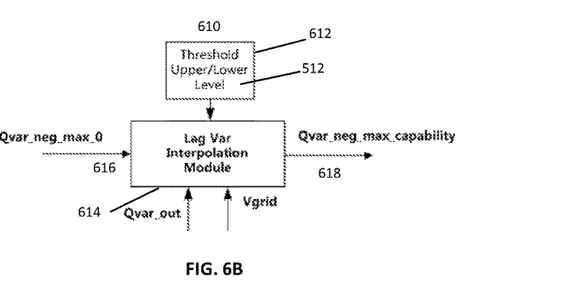
FIG. 6B is a block diagram illustration of a Q negative interpolation module constructed in accordance with the embodiments.

FIG. 6B is a block diagram illustration of a lag Q module 610 constructed in accordance with the embodiments. The lag Q module 610 includes a threshold upper/lower level module 612 and a lagvar interpolation module 614. The threshold upper/lower level module 612 processes the upper/lower level voltage threshold 512 above, discussed in reference to FIG. 5.

The lag var interpolation module 614 is configured to receive a conventionally determined Qvar_neg_max_0 prediction signal 616, Qvar_out, and Vgrid values as inputs. These input values are analyzed based upon the upper lower level voltage threshold 504. A Qvar_neg_max capability signal 618 is produced as an output from the lagvar negative interpolation module 614.

Figure 7:
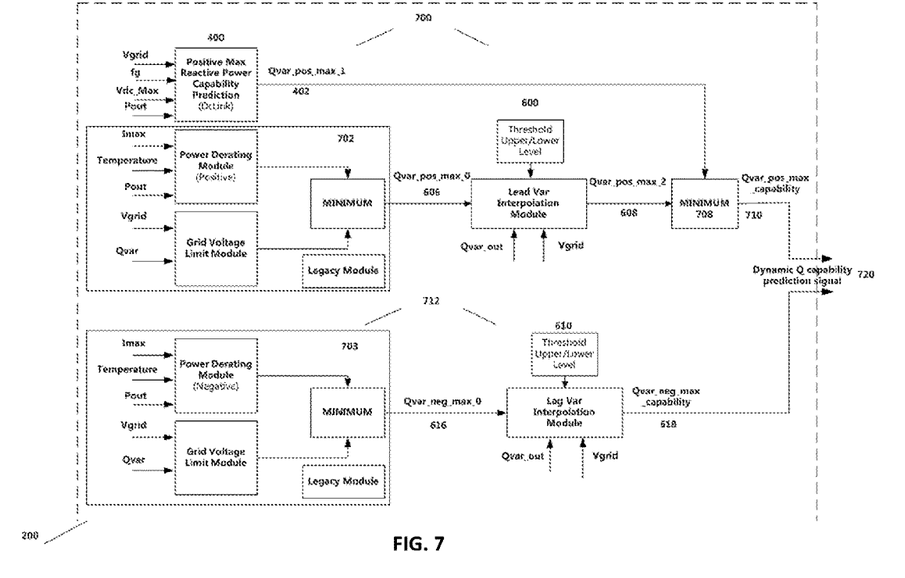
FIG. 7 is a more detailed block diagram illustration of the converter control module depicted in FIG. 2, constructed in accordance with the embodiments.

FIG. 7 is a more detailed block diagram illustration of the converter control module 200 depicted in FIG. 2. Although the converter module 200 can be included within the grid-tied converter 106, the present invention is not so limited. For example, the converter module 200 could be a stand-alone component, embedded within another module, or provided in a completely different configuration.

In the illustrious example of FIG. 7, the converter module 200 includes a lead reactive power capability prediction segment 700, including a legacy module 702. The legacy module 702 conventionally determines Qvar_pos_max_0 signal 606, noted above in the discussion of FIG. 6A. In conventional systems, the Qvar_pos_max_0 signal 606 is used as a reference limiter to an inverter, or converter.

In the embodiments, however, the Qvar_pos_max_0 signal 606 is provided as an input to the lead Q module 600, where the Qvar_pos_max_2 capability signal 608 is produced as an output, also noted above. In the exemplary embodiment depicted in FIG. 7, the Qvar_pos_max_2 capability signal 608 is updated in response to the dynamically determined Qvar_pos_max_1 signal 402 prediction value. This update occurs within a minimum (e.g., combiner) module 708 to find a minimum value. A Qvar_pos_max_capability signal 710 is produced as an output signal.

Similarly, the converter module 200 includes a lag reactive power capability prediction segment 712 and a legacy module 703. The legacy module 703 conventionally determines the Qvar_neg_max_0 signal 616, noted above in the discussion of FIG. 6B. The Qvar_neg_max_0 signal 616 is provided as an input to the lag Q module 610, where the Qvar_neg_max_capability signal 618 is produced as an output.

In accordance with the exemplary embodiments of the present invention, the Qvar_pos_max_capability signal 710 and the Qvar_neg_max_capability signal 618 are representative of a dynamic Q capability prediction signal 720, provided as a real-time as output signal from the converter control module 200. The dynamic Qcapability prediction signal 720 is indicative of the real-time Q compensation volume of the embodiments.

More specifically, the dynamic Q capability prediction signal 720 can be provided as a more accurate and comprehensive reference information to the grid management system. The grid management system can utilize this prediction information to leverage the converter's reactive power capability when regulating the grid voltage. This technique enhances the operational efficiency of the electricity power management system 100.

Practical advantages of the dynamic Q capability prediction technique of the embodiments, over the conventional Q capability prediction approaches, are graphically depicted in FIGS. 8 and 9 below.

Figure 8:
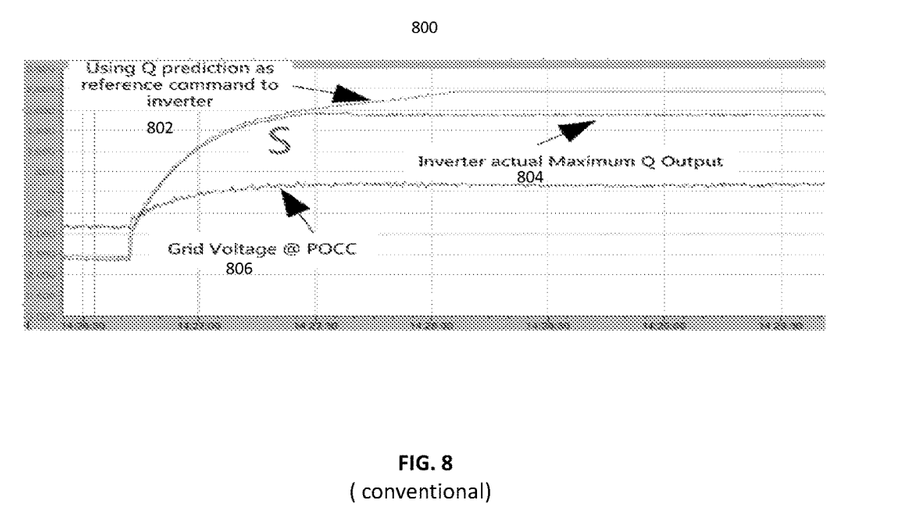
FIG. 8 is a graphical illustration depicting a comparison between a conventional Q capability prediction waveform and an actual maximum Q output waveform.

FIG. 8 is a graphical illustration 800 depicting a comparison between a conventional Q capability prediction value waveform 802 and an actual maximum Q output waveform 804. That is, FIG. 8 depicts the actual problem of conventional reactive power capability prediction systems currently deployed in the field. The graphical illustration 800 is using a converter, or an inverter's, reactive power capability prediction value as set points sending back to the inverter to verify the function.

In the graphical illustration 800, grid voltage 806 rises as the inverter feeds lead reactive power into the grid. However, at a point S, the conventional reactive power capability prediction value 802 and the actual maximum Q value 804 began to diverge. This divergence occurs because the DC-link voltage maximum limits, as discussed above, was not considered nor factored into the reactive power capability prediction value of these conventional approaches.

Ideally, to reliably and efficiently compensate for faults, and stabilize the grid voltage Vg, the reactive power capability prediction value 802 and the actual capability value 804 should be very close. These values should not be diverging, as described above, and depicted in FIG. 8.

Figure 9A:
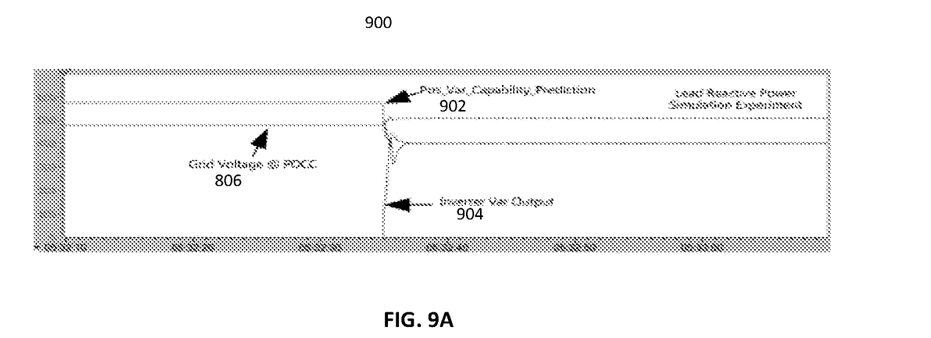
FIGS. 9A and 9B are graphical illustrations lead and lag Q capability prediction waveforms, respectively, to the actual maximum Q output waveform, in accordance with the embodiments.

FIG. 9A is a graphical illustration 900 of a simulated lead (positive) Var prediction capability waveform 902 to an actual lead Var output waveform 904, as the grid voltage Vg 806 was hitting the upper limit defied in local grid code, in accordance with the embodiments. In the graphical illustration 900, when the lead Var capability prediction waveform 902 is provided as a command to the converter, the lead Var prediction 902 and the actual lead Var output waveform 904 are virtually the same.

Figure 9B:
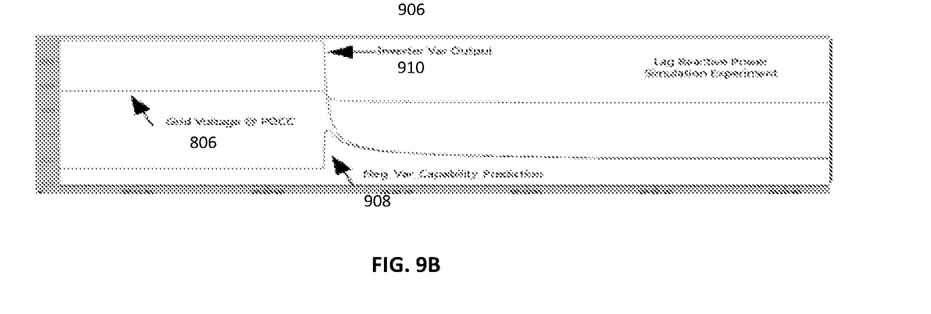

FIG. 9B is a graphical illustration 906 of a simulated lag (negative) Var prediction capability waveform 908 to an actual lag Var output waveform 910, as the grid voltage Vg 806 was hitting the lower limit defined in local grid code, in accordance with the embodiments. As noted above, with respect to FIG. 9A, the lag Var capability prediction 908 and the actual lag Var output waveform 910 are virtually the same.

Figure 10:
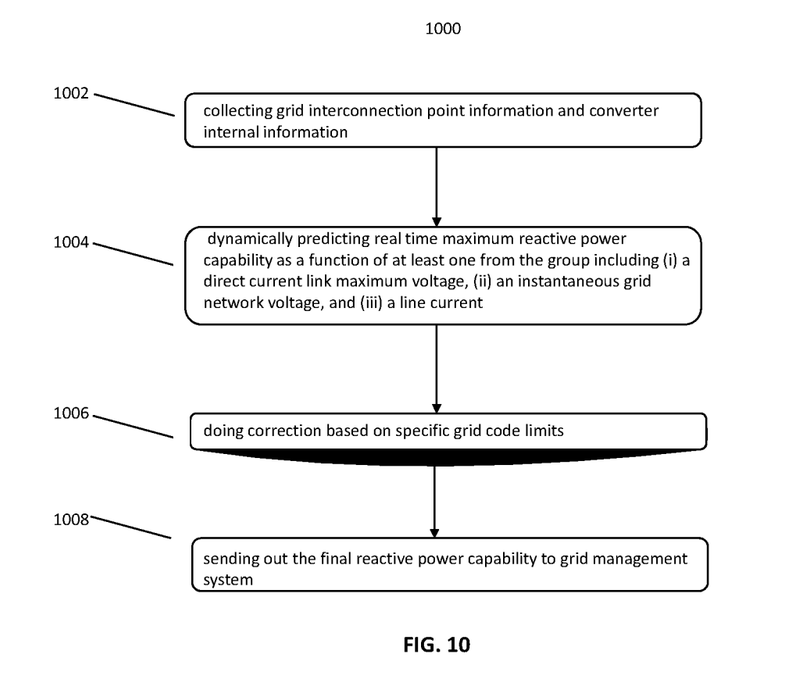
FIG. 10 is a flowchart of an exemplary method of practicing an embodiment of the present invention.

FIG. 10 is a flowchart of an exemplary method 1000 of practicing an embodiment of the present invention. The method 1000 includes a step 1002 for collecting grid interconnection point information and converter internal information A step 1004 includes dynamically predicting the real time maximum reactive power capability as a function of at least one from the group including (i) a direct current link maximum voltage, (ii) an instantaneous grid network voltage, and (iii) a line current. In step 1006, doing correction based on specific grid code limits. In step 1008, sending out the final reactive power capability information to grid management system.

Those skilled in the art, particularly in light of the foregoing teachings, may make alternative embodiments, examples, and modifications that would still be encompassed by the technology. Further, it should be understood that the terminology used to describe the technology is intended to be in the nature of words of description rather than of limitation.

Those skilled in the art will also appreciate that various adaptations and modifications of the embodiments described above can be configured without departing from the scope and spirit of the technology. Therefore, it is to be understood that, within the scope of the appended claims, the invention may be practiced other than as specifically described herein.

We claim:

1. A system for regulating energy, the system comprising:
an electricity grid;
an energy source;
a grid-tied converter connected to the electricity grid and to ta DC link, the converter being configured to receive the energy from the energy source through the DC link and to supply energy to the electricty grid; and
a controller configured to dynamically predict real-time maximum reactive power capability of the converter that includes a lead maximum reactive power capability and a lag maximum reactyive power capability;
wherein the predicted maximum reactive power capability is configured for optimizing regulation of the energy;
wherein the controller comprises:
a lead maximum reactive power capability prediction module that derives a first lead maximum reactive power signal;
a lead reactive power module that derives a second lead maximum reactive power signal from a zeroth lead maximum reactive power signal with reference to upper and lower threshold voltage levels associated with field grid codes, the reactive output of the converter and the instantaneous line voltage of the electricity grid; and a lag reactive power module that derives the lag maximum reactive power capability from a zeroth lead maximum reactive power signal with reference to upper and lower threshold voltage levels associated with field grid codes, the reactive output of the converter and the instantaneous line voltage of the electricity grid;

wherein the lead maximum reactive power capability is the minimum of the first lead maximum reactive power signal and the second lead maximum reactive power signal.

2. The system according to claim 1, wherein the source includes at least one from the group including solar energy and wind energy.

3. The system according to claim 1, wherein the maximum reactive power capability prediction is independent of interconnected grid impedance.

4. A method for regulating energy provided to an electricity grid from an energy source, the method comprising:

receiving, in a grid-tied converter, the energy from the energy source through a DC link;

dynamically predicting, in the converter, the real time maximum reactive power capability of the converter that includes a lead maximum reactive power capability and a lag maximum power capability; and configuring the predicted maximum reactive power capability for optimizing regulation of the energy;

wherein dynamically predicting the real time maximum reactive power capability includes:

deriving, using a lead maximum reactive power capability prediction module, a first lead maximum reactive power signal;

deriving, using a lead reactive power module, a second lead maximum reactive power signal from a zeroth lead maximum reactive power signal with reference to upper and lower threshold voltage levels associated with field grid codes, the reactive output of the converter and the instantaneous line voltage of the electricity grid; and deriving, using a lag reactive power module, the lag maximum reactive power capability from a zeroth lead maximum reactive power signal with reference to upper and lower threshold voltage levels associated with field grid codes, the reactive output of the converter and the instantaneous line voltage of the electricity grid;

wherein the lead maximum reactive power capability is the minimum of the first lead maximum reactive power signal and the second lead maximum reactive power signal.

5. The method according to claim 4, wherein the source includes at least one from the group including solar energy and wind energy.

6. The method according to claim 4, wherein the maximum reactive power capability prediction is independent of interconnected grid impedance.

* * * * *